Feb. 17, 1970     W. RIEDEMANN     3,495,409
APPARATUS FOR BUILDING A RETAINING WALL ALONG
A BANK OF A BODY OF WATER
Filed July 10, 1967     6 Sheets-Sheet 4

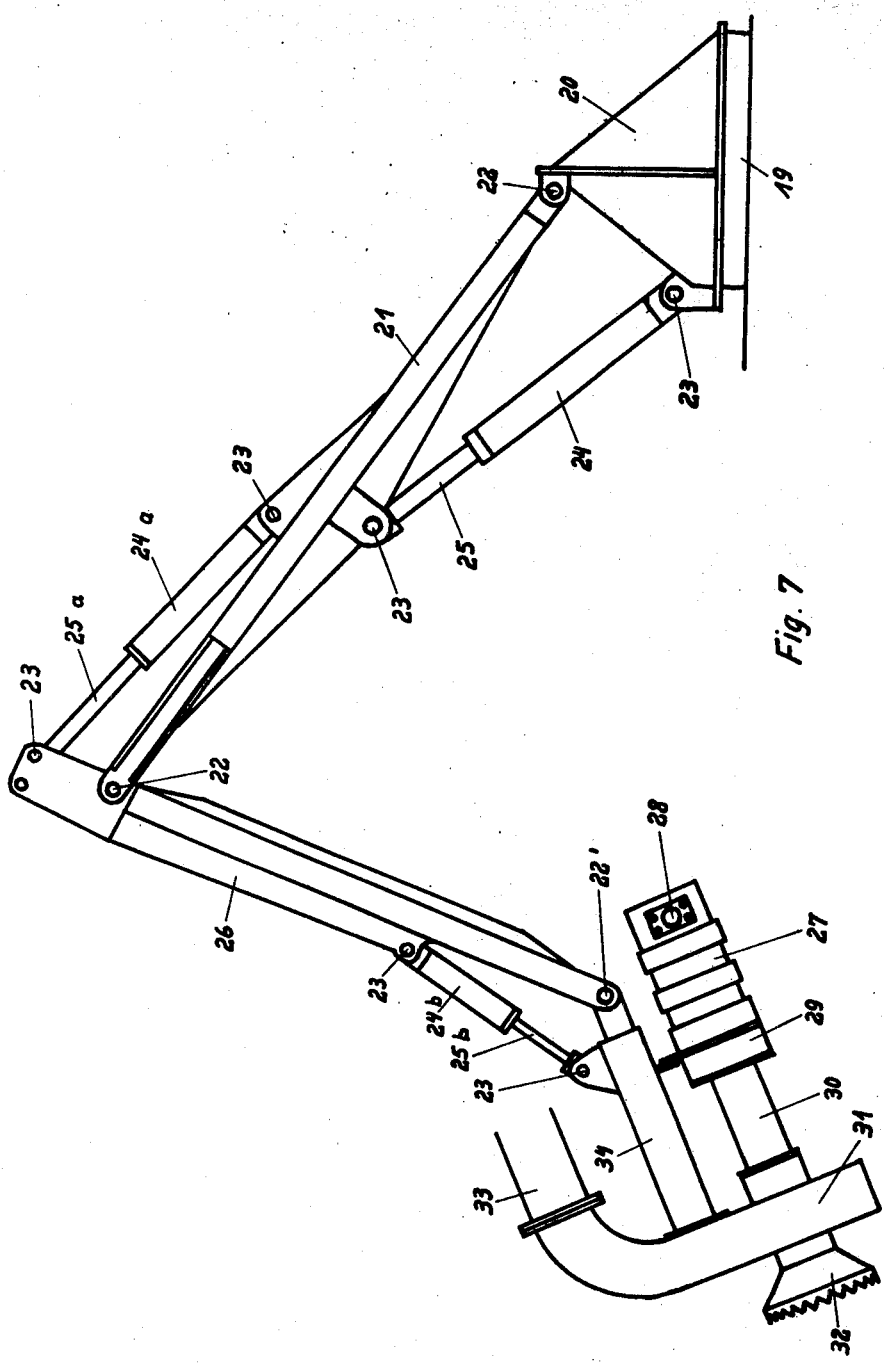

United States Patent Office 3,495,409
Patented Feb. 17, 1970

3,495,409
APPARATUS FOR BUILDING A RETAINING WALL ALONG A BANK OF A BODY OF WATER
Wilhelm Riedemann, Deichstrasse 5, Uetersen, Holstein, Germany
Filed July 10, 1967, Ser. No. 652,162
Claims priority, application Germany, Jan. 10, 1967, R 45,019
Int. Cl. E02b 3/00, 3/04
U.S. Cl. 61—3                                    9 Claims

ABSTRACT OF THE DISCLOSURE

A dredge pump transported by a barge along a body of water, discharges dredged material into the space between a bank and a retaining wall built of blocks by a crane carried by the barge. During the preceding setting of the blocks by the crane, the discharge outlet means of the dredge pump is attached to each block, and water is pumped through passages in the blocks to wash away material at the bottom of the water so that the blocks can be set by the crane in a low position.

BACKGROUND OF THE INVENTION

It is known to dredge bodies of water such as channels, ditches, or river beds by a suction dredge pump mounted on a barge, and to then shore the banks of the river in an operation completely independent of the dredging operation, and carried out by different apparatus.

It is one object of the invention to combine the dredging with the shoring operations, and to provide a method and apparatus for clearing a body of water in a single continuous operation including dredging and shoring of the banks.

SUMMARY OF THE INVENTION

With this object in view, the invention comprises dredging a body of water by suction, setting blocks along at least one bank of the body of water to form a retaining wall; and discharging dredged material into the space between the bank and the retaining wall until the space is filled.

The operations comprise the setting blocks having downwardly extending passages, and pumping water into the passages of each block while the same is being set so that water is downwardly discharged through the passages and washes away material at the bottom of the body of water so that the blocks can be set in a low position to form the retaining wall.

An apparatus according to the invention comprises carrier means, such as a barge, movable in one direction along a bank of a body of water, setting means such as a crane, mounted on the barge for setting blocks along the bank to form a retaining wall; suction pump means supported on the barge and having a suction inlet means located in the body of water and a discharge tube having a discharge outlet means located in the region of the bank and adapted to discharge water and dredged material.

While blocks having downwardly extending passages are set, the discharge outlet means is connected to each block so that the blocks can be set in a low position. When the retaining wall is at least partly completed, the barge is moved in one direction along the body of water while the suction pump dredges material and discharges the same through the discharge outlet means into a space between the retaining wall and the bank so that this space is filled.

The barge is provided with a propelling motor, and can be anchored by a pair of stepwise movable vertical posts.

During a dredging operation, the bottom of the body of water is dredged to the desired depth while a rotary suction head of the dredge pump is pressed into the sand or other material at the bottom. The operating means which mount the dredge pump on the barge, preferably include movable supporting arms operated by hydraulic motors. It is preferred to operate the dredge pump also by a hydraulic motor.

The blocks may be made of concrete and have a central main inlet passage from which a plurality of outlet passages extend toward the bottom and the side of the block facing a bank so that the water pumped through the block washes material away from the bank and the adjacent bottom. When the block is set on the bottom, it sinks to a desired low position while the material is washed away from the bottom. During this operation, only water need to be pumped by the dredge pump and when several blocks are set to form a retaining wall, the dredge pump is operated to suck sand and like material from the bottom and to discharge it behind the retaining wall. During this operation the barge may move continuously in one direction with the dredging pump moving along the bottom and the discharge outlet moving along the previously built portion of the retaining wall.

Preferably, a small boat or float is dragged by the barge and carries a supply of blocks from which the same are picked up by the crane to be set at the banks.

Vertically movable post can be moved in a stepping motion to stepwise advance the barge with the dredge pump, while anchoring the barge in each operating position for angular movement. The post can be retracted to an inoperative position in which an outboard motor moves the barge comparatively fast to another part of the body of water.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 7 is a fragmentary side view illustrating the dredge pump and operating means supporting the same on the barge;

DESCRIPTION OF THE PREFERRED EMBODIMENT

Figure 12:
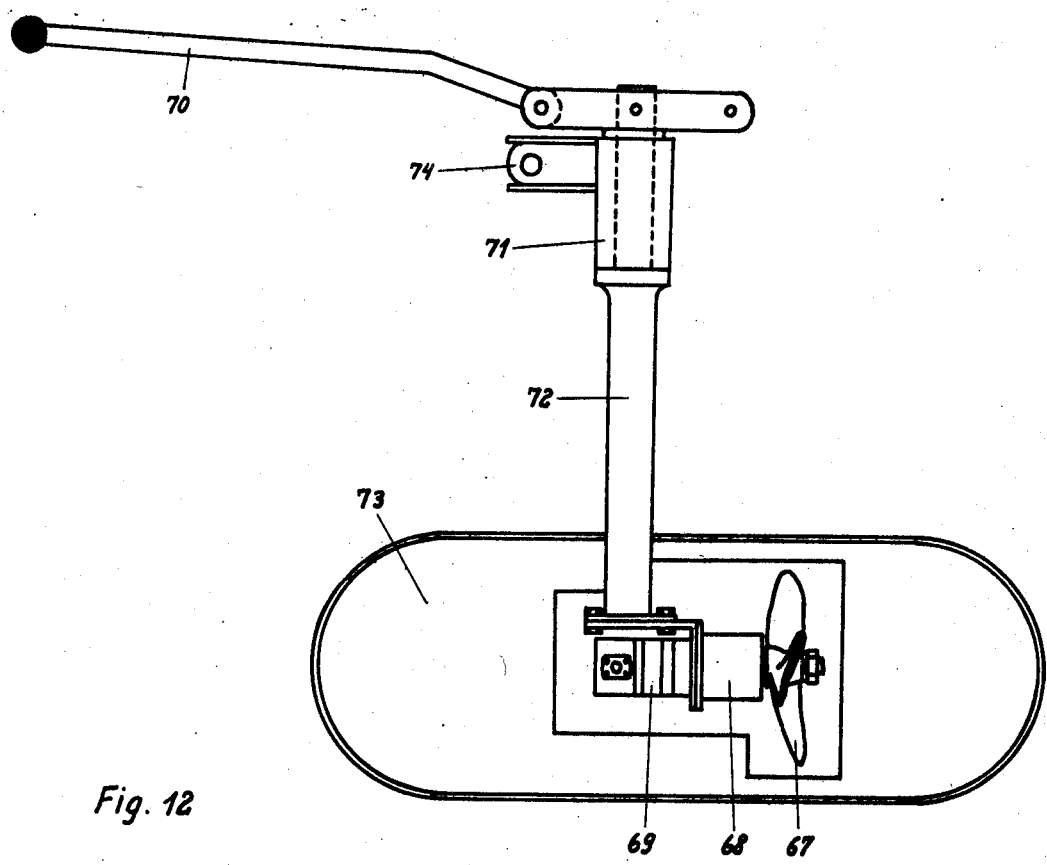
FIG. 12 is a fragmentary sectional view illustrating the mounting of an outboard motor and rudder on the barge.

A barge or pontoon 1 has a cockpit 2 in which the controls of all motors are located, and which has windows through which the operator can observe the progress of the work. Flood lights 4 are provided on the roof of the structure for use during night work. Machinery, including an oil pump for driving hydraulic motors, as will be described hereinafter, is located in the compartment 3. A rudder 73 with a cutout for a propeller 67 is secured to a shaft 72 which, as best seen in FIG. 12, carries on a bracket the bearing 68 of the propeller shaft and a hydraulic motor 69 by which the propeller shaft is driven. Rudder shaft 72 is turnable in a bearing 71 and secured to a control stick 70. Bearing 71 has a projecting bracket 74 by which it is secured to the stern of a barge or pontoon 1 so that the same can be steered by turning rudder shaft 72 together with rudder 73, hydraulic motor 69 and propeller 67 when the barge is to be moved along a body of water from one working place to another.

Figure 2:
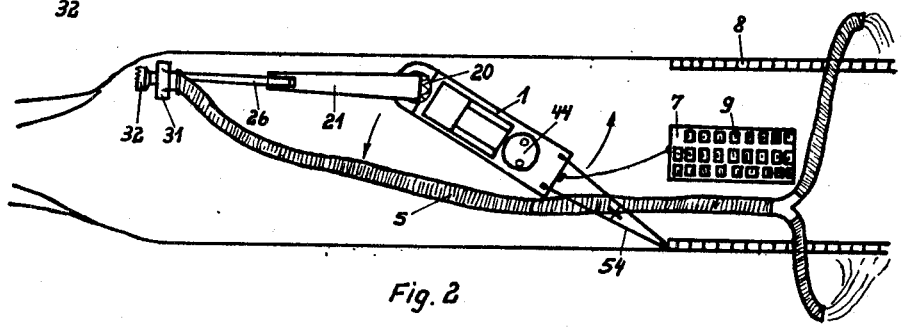
FIG. 2 is a fragmentary schematic plan view of the embodiment of FIG. 1 in another operational position, and shown at a reduced scale.
Figure 3:
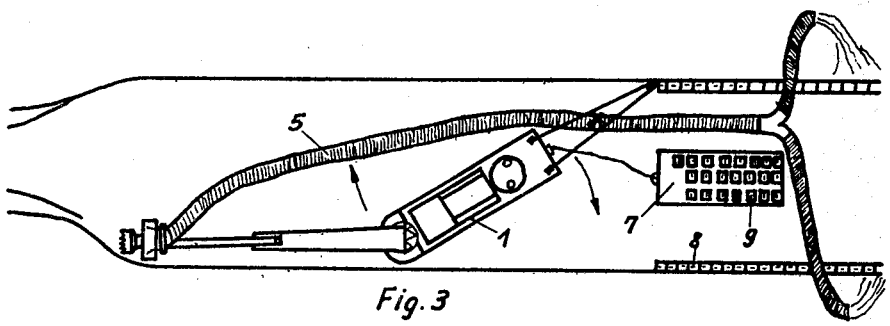
FIG. 3 is a plan view of the embodiment of FIG. 1 in a further operational position, and shown at the scale of FIG. 2.

A small boat or float 7 is secured by a rope to the stern of the barge, and carries a supply of blocks 9, as shown in FIGS. 2 and 3.

Figure 1:
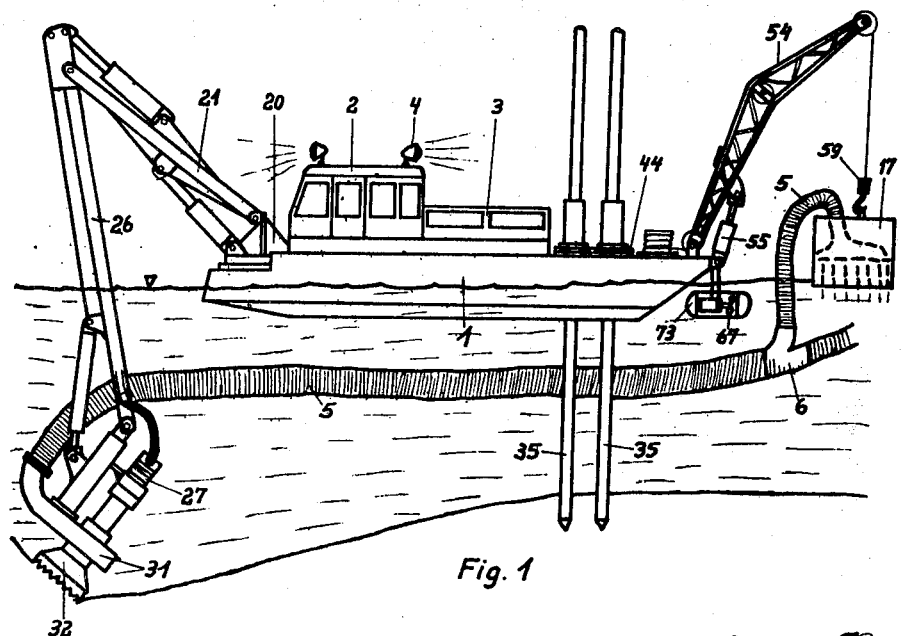
FIG. 1 is a fragmentary schematic side view of one embodiment of a dredging apparatus according to the invention in a position in which blocks are set along the bank of a body of water.
Figure 8:
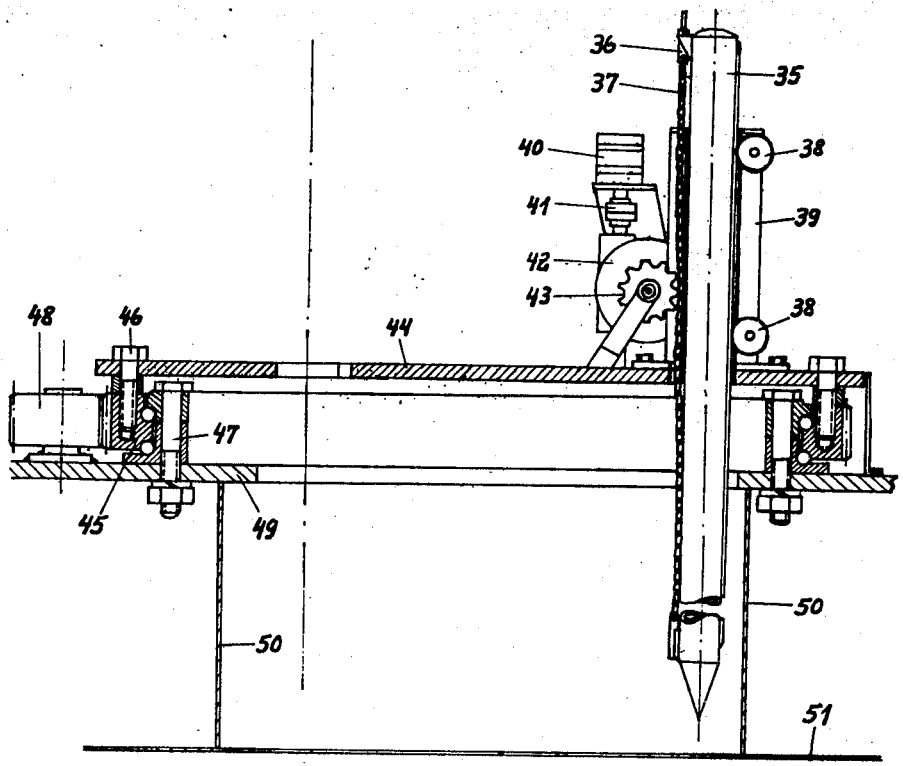
FIG. 8 is a fragmentary sectional view taken on line 8—8 in FIG. 9 and illustrating apparatus for operating a pair of anchoring posts on the barge.
Figure 9:
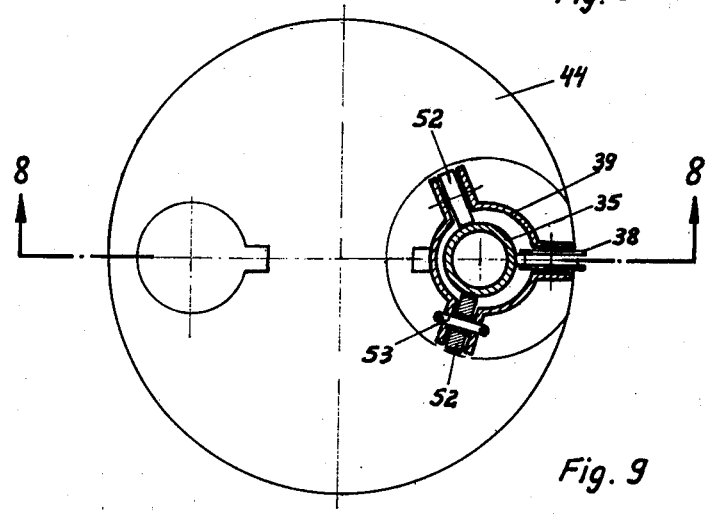
FIG. 9 is a fragmentary plan view of the apparatus of FIG. 8.

As shown in FIGS. 1, 8 and 9 a pair of vertically movable posts 35 are provided for anchoring the barge during working operations. The hull 51 of the barge has a cutout which is closed by a metal tube 50 welded to the hull 51 and to the deck plate 49 of the barge.

A large ball bearing turntable including an inner ring secured by screws 47 to deck plate 49, balls, and an outer ring 45 secured by screws 46 to a cover 44 surrounds the circular opening in deck plate 49 above tube 50. The turntable ring 45 has an outer gear meshing with a small gear 48 driven by a motor, not shown, so that member 45, 46, 44 can be rotated.

Cover plate 44 has two openings in which guide members 39 are mounted, only one guide member 39 being shown in FIGS. 8 and 9. Each guide member has a lower flange secured by screws to cover plate 44 as best seen in FIG. 8, and have projecting channels, best seen in FIG. 9, in which a pair of rollers 38, and two pairs of rollers 52 are mounted for rotation about journal pins 53. All rollers 38 and 52 are in rolling engagement with a post 35, rollers 38 having annular grooves for engaging a rib on post 35 preventing turning of the post about its own axis.

Each post 35 carries a straight chain 37 which can be tensioned by a tensioning device 36, or a rack bar may be secured to the post. The chain 37 of each post 35 meshes with a chain wheel 43 mounted on a bracket secured to cover plate 44 and driven from a hydraulic motor 40 through an elastic coupling 41 and a worm gear drive 42. Each hydraulic motor 40 is connected by a hose, not shown, with the main oil pump in compartment 3, and the flow of oil into hydraulic motors 40 can be controlled by the operator in cockpit 2 so that posts 35 are independently raised and lowered under the control of the operator. When both posts are raised, the turntable 44, 45 can be turned to place the posts in a suitable position, whereupon the posts can be driven down into the bottom of a body of water, as shown in FIG. 1, to anchor the barge. It is also possible to angularly displace the barge by rotating the turntable while the posts are anchored.

Figure 10:
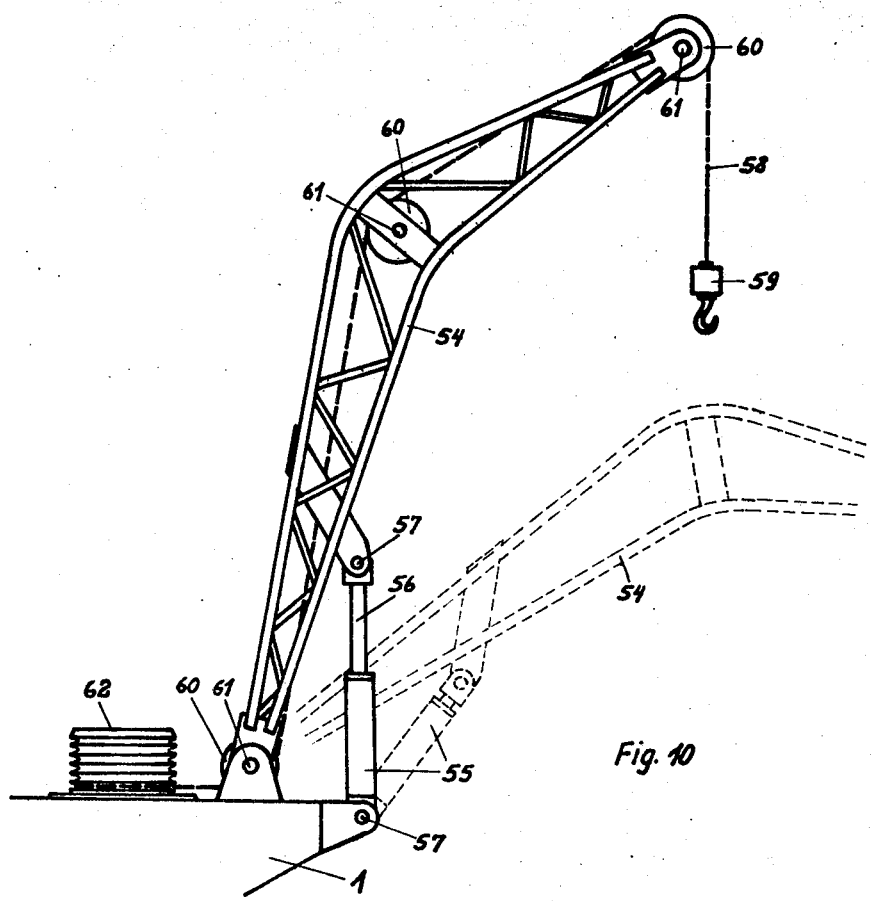
FIG. 10 is a fragmentary side view illustrating a crane for setting blocks.
Figure 11:
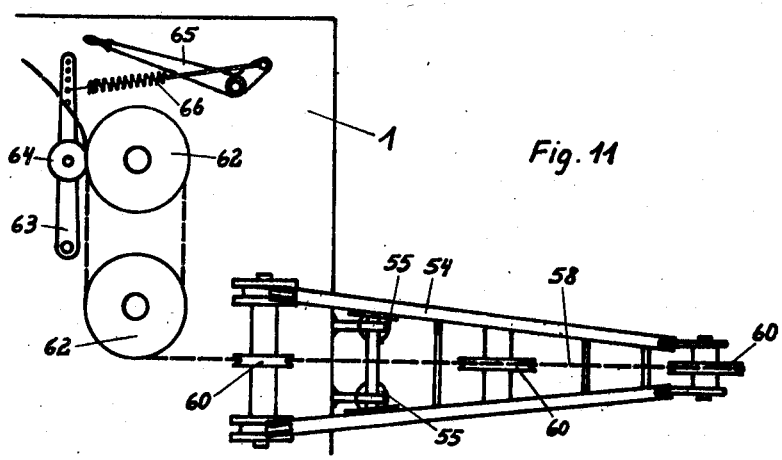
FIG. 11 is a plan view of the apparatus of FIG. 10.

A crane arm 54, best seen in FIGS. 10 and 11, is mounted for turning movement about a horizontal shaft 61 which is supported in brackets secured to the deck plate at the rear end of barge 1. A pulley 60 is turnably mounted on shaft 61 and two other pulleys 60 are mounted along the length of crane arm 54 for turning movement. A rope 58 with a hook 59 is guided over the three pulleys 60, and then passes in several loops about a pair of capstan drums 62 which are provided with helical grooves. The free end of the rope is pressed by a roll 64 against one of the capstan drums, roll 64 being turnably mounted on a lever 63 connected by spring 66 to a tensioning bellcrank lever 65 which is manually operated if rope 58 is to be released. Roll 64 in the operative position assures that the rope is held with sufficient friction on the capstan drums 62.

A pair of hydraulic motors 55 is provided for turning crane arm 54 about the lowest shaft 61, each hydraulic motor 55 having a piston rod 56 connected by a pivot 57 to a bracket on crane arm 54.

The operator can control the position of crane 54 and hook 59 to pick up a block 17 from the float 7, in a pick-up position, and to set in a setting position the block along the bank of the body of water to form a retaining wall 8 on one or the other bank.

Capstan drums 62 have shafts driven by a motor, not shown, located under the deck so that heavy concrete blocks can be lifted by hook 59. FIG. 1 shows a block 17 provided with an ear for receiving hook 59.

Near the bow of the barge, a turntable 19, similar to the turntable 44, 45 described with reference to FIG. 8, is mounted on the deck plate, and is provided with an outer peripheral gear meshing with a pinion, not shown, driven by a motor. As best seen in FIG. 7, the turntable bracket 20 carries a pivot 22 connected with a support lever 21 whose other end is connected by another pivot 22 to an operating lever 26. A second pivot 23 on turntable bracket 20 is connected with the cylinder 24 of a hydraulic motor whose piston rod 25 is connected by another pivot 23 to support lever 21. Another hydraulic cylinder 24a is connected by a pivot 23 to a bracket on support lever 21, while the respective piston rod 25a is connected by pivot 23 to the end of operating lever 26.

By operation of hydraulic motor 24, support lever 21 can be raised and lowered, and by operation of hydraulic motor 24a, operating lever 26 can be turned about pivot 22 on support lever 21.

A support member 34 carries a suction pump 31 which has a discharge elbow secured to a discharge tube 33, as best seen in FIG. 7. A bracket on support member 34 is connected by pivot 23 to the piston rod 25b of a hydraulic motor 24b which is attached by a pivot 23 to operating lever 26, so that by operation of hydraulic motor 24b, support member 34 with pump 31 is turned about pivot 22' to any desired position. Hydraulic motors 24, 24a, 24b are connected by flexible hoses, not shown, with the main pump in compartment 3, and are individually controlled by valves located in cockpit 2. A rotary hydraulic motor 27 drives the shaft of pump 31 carrying the cutter head 32 in which the suction inlet of the pump 31 is located. The shaft, not shown, is mounted in a bearing 30 and connected by an elastic coupling, not shown, located in housing 29, to hydraulic motor 27. The inlet of hydraulic motor 27 has attaching means 28 for attaching a hose, not shown, connected with the main pump in compartment 3, so that under control of valves located in the cockpit 2, motor 27 is started and stopped for driving the suction dredge pump 31.

Outlet tube 33 is attached to a flexible discharge hose or tube 5 which forks at 6 into two branches of sufficient length to reach the banks of the body of water.

By operation of hydraulic motors 24, 24a, 24b, and by driving turntable 44, 45 while posts 35 are anchored in the bottom of the body of water, cutter head 32 can be placed in any desired position, either at the bottom dredging sand and like material, or in the water in which event water is sucked and discharged through hose 5.

Figure 4:
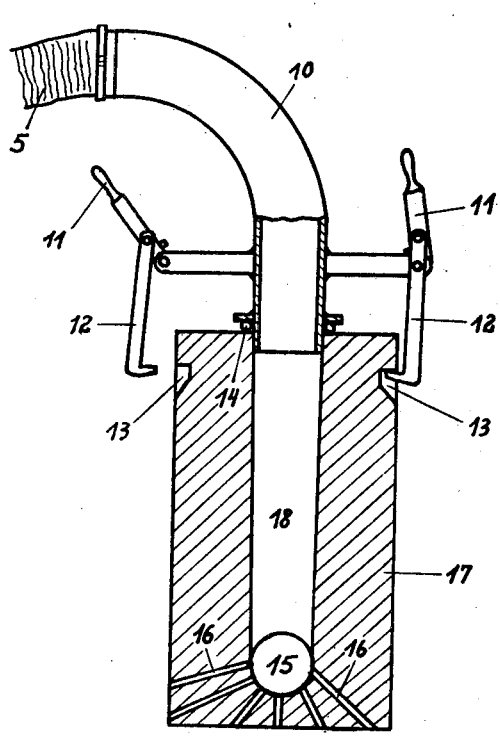
FIG. 4 is a sectional view illustrating a block connected to the discharge outlet means of the dredge pump.

As best seen in FIGS. 1 and 4, the end of the discharge hose 5 is connected with an elbow pipe 10 forming a sleeve which can be partly inserted into a central passage 18 of a block 17. Elbow pipe 10 has a pair of brackets on which toggle levers 11, 12 are mounted, so that by manual operation of toggle levers 11, the hooked ends of levers 12 are pressed into recesses 13 in block 17 whereby the discharge outlet means 10 is firmly secured to the respective block 17 in a position in which the outlet of elbow pipe 10 communicates with passage 18. A flange on elbow pipe 10 cooperates with a sealing ring 14 to seal the connection.

Figures 5, 6:
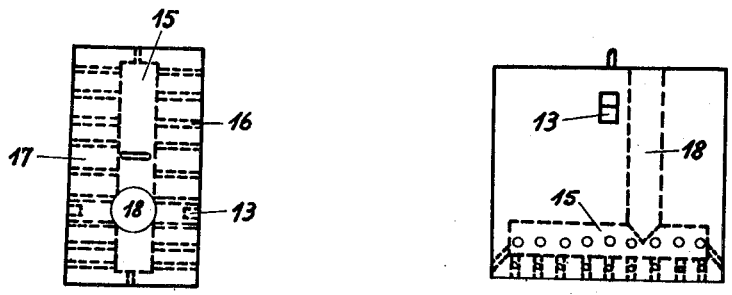
FIG. 5 is a side view of the block of FIG. 4, shown at a reduced scale.
FIG. 6 is a plan view of the block of FIG. 4, shown at a reduced scale.

Each block 17 has at its lower end a transverse passage 15, best seen in FIGS. 5 and 6, from which a plurality of narrow outlet passages 16 lead downwardly to the bottom face and one lateral face of block 17. This lateral face confronts the bank of the body of water when crane 54, 59, serving as a setting means for blocks 17, picks up the block from the supply of blocks 9 on float 7 and sets the same along the bank of the body of water to form a retaining wall 8.

When the crane has placed a block 17 in the desired position at the bank, motor 27 is started while the operator places head 32 in water, so that water is discharged through discharge tube 5 and discharge outlet means 10 into the central passage 18 of the respective block 17 from where water is discharged through passages 16 in downward and lateral directions and washes away sand and like material at the bottom and the respective bank of the body of water, permitting the block to sink or to be set in a lower position resting on comparatively firm ground.

This operation is repeated and blocks 17 are successively set first in a lower row and then in a second row, if desired, on the first row to form a retaining wall directly adjacent the bank.

When a retaining wall portion 8 of sufficient length has been constructed, at least one branch of tube or hose 5 is separated from the elbow pipe 10 and placed in the region of the bank to discharge in the space between the partly erected retaining wall 8 and the bank. The operator controls support lever 21 and operating lever 26 to place the cutter head 32 of the dredge pump 31 against the bottom or bank of the body of water, so that sand and like material is sucked by the pump and discharged through tube 5 and the respective branch or branches, as shown in FIGS. 2 and 3, so that the dredged and pumped material fills the spaces between the retaining wall 8 and the banks.

During these operations, the barge may be stepwise moved by alternately retracting posts 35 and reinserting the same again into the bottom, while the supply of blocks 9 follows the barge with float 7.

It will be understood that each of the elements described above, or two or more together, may also find a useful application in other types of dredging arrangements, differing from the types described above.

While the invention has been illustrated and described as embodied in a dredging arrangement in which dredging of a body of water and erection of retaining walls carried out by apparatus mounted on a single barge, it is not intended to be limited to the details shown since various modifications and structural changes may be made without departing in any way from the spirit of the present invention.

What is claimed as new and desired to be protected by Letters Patent is set forth in the appended claims:

1. Apparatus for building a retaining wall along the bank of a body of water, comprising, in combination, barge means movable along a body of water; a plurality of blocks transported by said barge means, each block having passage means downward extending therethrough and having an outlet and an inlet; suction pump means supported on said barge means and having a suction inlet means located in said body of water and a flexible discharge tube having at least one discharge outlet means at one end; attaching means mounted on said one end of said discharge tube for attaching said discharge outlet means to said inlet of any one of said blocks; setting means mounted on said barge means for movement between a pick up position located in the region of said blocks and a setting position located in the region of a bank of said body of water for successively placing blocks to which said discharge outlet means is attached along the bank for forming a retaining wall; and means for operating said suction pump means during setting of each block so that water flows through said passage means and washes material from the bank so that each block can be set in a low position on firm ground.

2. Apparatus as claimed in claim 1 wherein said passage means of each of said blocks includes a main passage having said inlet on top of said block and a lower end in said block, and a plurality of outlet passages connected with said lower end and having outlets, respectively, located in the lower portion of said block.

3. Apparatus as claimed in claim 2 wherein some of said outlet passages have said outlets at the bottom face of said block, and other outlet passages have outlets on a lateral face of said block adapted to confront the bank in the set position of said block.

4. Apparatus as claimed in claim 1 including movable operating means mounted on said barge means for supporting and moving said suction pump means between a first position in which said suction inlet means is located in water so that water is discharged through said passage means of the block to which said discharge outlet means is attached, and a second position in which said suction inlet means is located on and draws material from the bottom of said body of water and discharges slurry from said discharge outlet means; and wherein said one end of said discharge outlet means is disconnected in said second position from any block and is placed above said retaining wall to discharge the slurry into the space between the bank of the body of water and said retaining wall.

5. Apparatus as claimed in claim 4 wherein said flexible discharge tube forks and has two branch tubes, each of which has a discharge outlet means so that said discharge outlet means can be placed on two banks, respectively, of the body of water.

6. Apparatus as claimed in claim 1 wherein said barge means include a barge supporting said suction pump means and setting means, and a floating means for supporting a supply of said blocks and being dragged by said barge; and wherein said setting means includes a crane having a holding portion located in the region of said floating means in said pick up position of said setting means for attachment to the block to which said discharge tube is attached.

7. Apparatus as claimed in claim 1 comprising a pair of posts mounted on said barge means for vertical movement between an inoperative raised position and a lower anchoring position; drive means for moving said posts between said positions thereof; and a driven turntable having bearing openings for said posts and being turnable for causing stepwise movements of said posts for stepwise moving and angularly displacing said barge means between angular positions in which said setting means in said setting position is located in the regions of opposite banks of the body of water.

8. Apparatus as claimed in claim 1 wherein said discharge outlet means of said flexible discharge tube includes a sleeve fitting into said inlet of any one of said blocks; and wherein said attaching means include a pair of levers having holding portions for engaging opposite sides of said block; and wherein said opposite sides of said block are formed with recesses engaged by said holding portions of said levers.

9. Apparatus as claimed in claim 8 wherein said levers are manually operated toggle levers; and wherein said sleeve has a sealing flange pressed against an annular surface portion of said block when said toggle levers hold said block.

References Cited

UNITED STATES PATENTS

| | | | |
|---|---|---|---|
| 961,222 | 6/1910 | Fahrney | 61—38 |
| 1,792,065 | 2/1931 | Bowers | 37—73 |
| 1,892,701 | 1/1933 | Hoffman | 61—38 |
| 2,570,271 | 10/1951 | Pickett | 61—38 |
| 2,992,497 | 7/1961 | Davis | 37—58 |
| 3,086,305 | 4/1963 | West | 37—73 |

FOREIGN PATENTS 464,597  8/1928  Germany.

PETER M. CAUN, Primary Examiner

U.S. Cl. X.R.

37—58; 61—37, 46, 49